Jan. 27, 1953     O. M. HILLMAN     2,626,632
AUTOMATIC SHUTOFF VALVE
Filed Dec. 9, 1949     2 SHEETS—SHEET 1
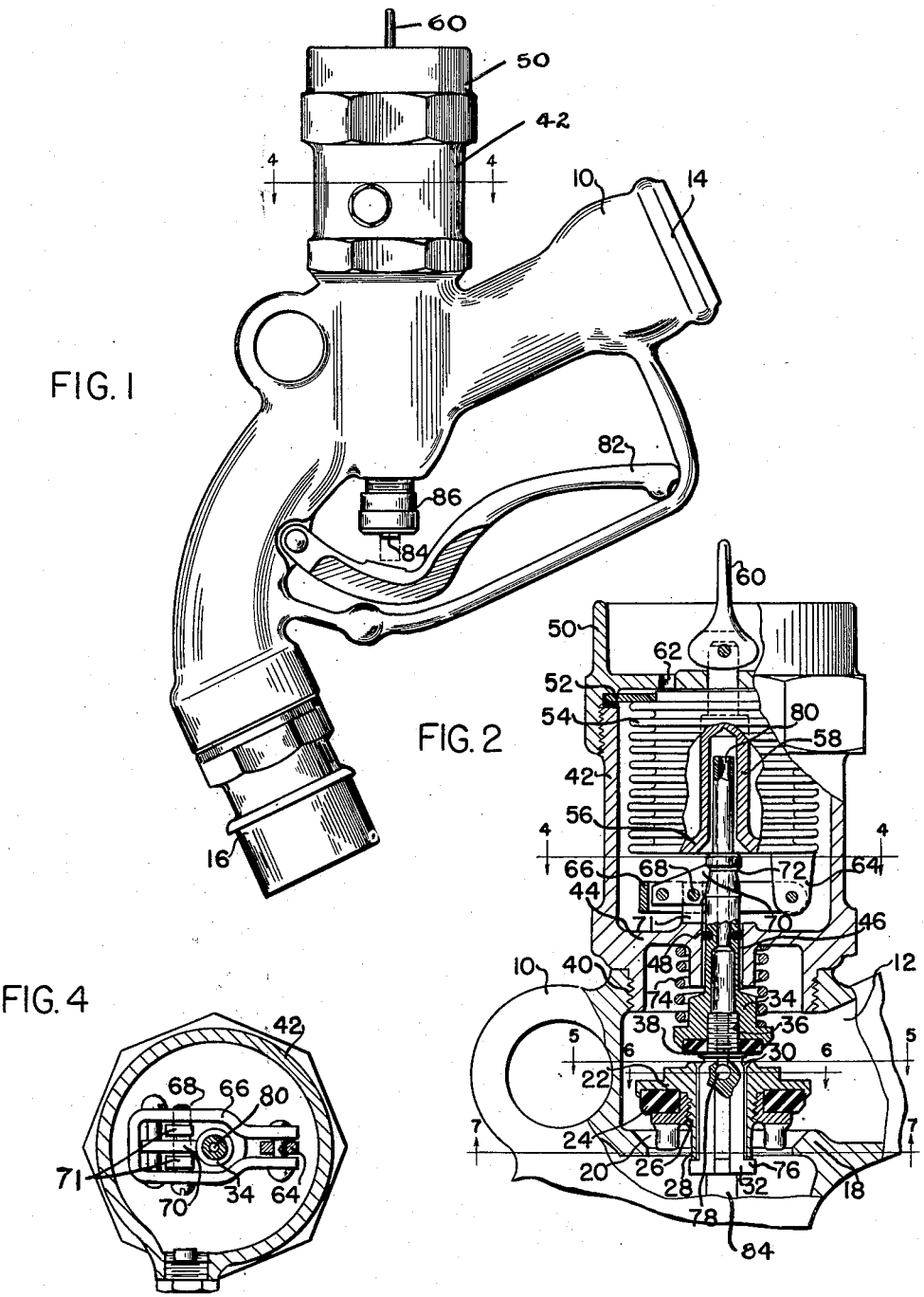
INVENTOR
OTHELLO M. HILLMAN
ATTORNEYS Jan. 27, 1953     O. M. HILLMAN     2,626,632
AUTOMATIC SHUTOFF VALVE Filed Dec. 9, 1949     2 SHEETS—SHEET 2

INVENTOR
OTHELLO M. HILLMAN
by Taulmin & Taulmin
ATTORNEYS

Patented Jan. 27, 1953

2,626,632

UNITED STATES PATENT OFFICE 2,626,632

AUTOMATIC SHUTOFF VALVE

Othello M. Hillman, Detroit, Mich., assignor to Buckeye Iron & Brass Works, Dayton, Ohio, a corporation of Ohio Application December 9, 1949, Serial No. 132,155

7 Claims. (Cl. 137—463)

This invention relates to valves, and particularly to valves for controlling the flow of gasoline and similar fluids which are often stored in underground tanks.

In the filling of underground tanks and the like, from tank trucks and tank cars, one of the difficulties which has always been encountered, is a determination of when the tank is filled, so that the flow of fluid thereto can be halted. A number of different arrangements have been devised for effecting this determination and automatically halting the discharge of fluid to the tank, but heretofore, the said arrangements have all been lacking in one or more respects. For example, a number of the valves of the prior art are quite expensive to manufacture, whereas, others are so constructed that the tank being filled must be completely full before the shut-off mechanism will be operated. In other instances, the valves are not reliable, and many times will not shut off automatically in the proper manner.

A particular object of the present invention is the provision of a valve adapted for use with the supply line from a tank truck or the like, and which will automatically interrupt the flow of fluid through the valve when the tank being filled reaches a predetermined level.

Another object is the provision of a valve of the type described, which is easy to operate, but which is highly effective for interrupting the fluid flow through the valve.

A still further object is the provision of an automatic cut-off valve of the type referred to, which is relatively inexpensive to manufacture, but which has improved operating characteristics over other valves of the same type.

A still further object is the provision of a cut-off valve in which the valve member can be latched open, and which can be quickly released so as to move to its closed position by the automatic tripping of the latch mechanism.

Another object is the provision of a cut-off valve having a latch therein for selectively latching the valve member open, in which the latch can be rendered ineffective to permit manual operation of the valve member when so desired.

These and other objects and advantages will become more apparent upon reference to the following description taken in connection with the accompanying drawings, in which:

Figure 1 is a side elevational view of a valve constructed according to my invention.

Figure 2 is a vertical section through the valve, looking in the same direction as in Figure 1 and showing the valve with its valve member latched open.

Figure 4 is a transverse section taken on the line 4—4 of Figure 2 and showing the construction of the latch mechanism.

Figure 3:
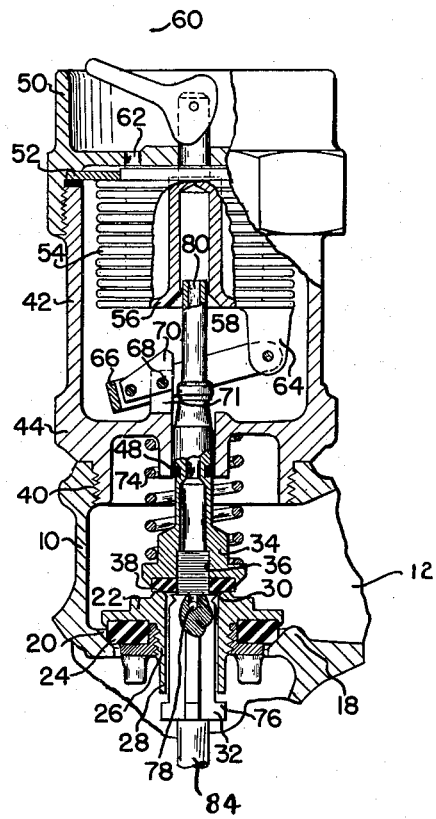
Figure 3 is a view similar to Figure 2, but showing the latch for the valve member in its releasing position, and the valve member closed.
Figure 5:
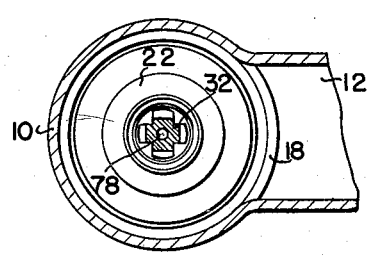
Figure 5 is a plan section indicated by line 5—5 on Figure 2 and showing the configuration of the stem forming a part of the valve member.
Figure 7:
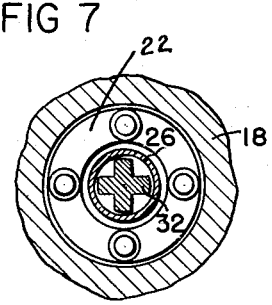
Figure 7 is a sectional view taken on the line 7—7 of Figure 2 and looking upwardly at the bottom of the valve member.
Figure 6:
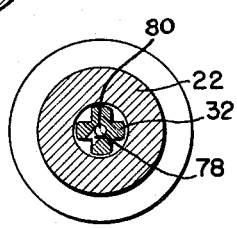
Figure 6 is a sectional view indicated by line 6—6 on Figure 2 and showing a porting arrangement formed in the valve stem.

Referring to the drawings more in detail, the valve shown in Figure 1 comprises a main body part 10 having a flow passage therethrough indicated by the reference numeral 12 in Figures 2 and 3. Body part 10 is adapted for connection at 14 to a supply pipe leading from a source of fluid to be controlled by the valve. The other end of body 10, as at 16, is adapted for connection with the fill pipe of a tank or the like, as for example, by means of a quick detachable coupling of any suitable and well known nature.

Disposed in flow passage 12 and body 10, is a partition 18, machined out as at 20, to form a valve seat.

Disposed on the inlet side of valve seat 20, is a valve member 22 comprising a disc of resilient material 24 for engaging the valve seat. Valve member 22 comprises a hollow carrier member 26 having a depending sleeve part 28. The upper end of carrier 26 is formed with an annular valve seat 30 of considerably smaller diameter than valve seat 20.

Extending through the hollow interior of carrier member 26 and valve member 22, is a fluted valve stem 32, which is threaded into another stem part 34, as at 36.

A valve disc 38 is clamped between stems 32 and 34, and is adapted for engaging valve seat 30, so that when both valve members are seated on their respective seats, the flow channel 12 is interrupted.

Body part 10 is bored and threaded in alignment with valve seat 20, as indicated at 40, and an auxiliary body part 42 is mounted in the said bore. Auxiliary body part 42 comprises a partition 44 centrally bored at 46 for reciprocably receiving valve stem 34. Stem 34 is annularly grooved and receives thereon, a resilient rubberlike O ring 48 that prevents leakage of fluid along bore 46 around the said stem.

The upper end of auxiliary body part 42 has threaded thereon, a closure member 50 which serves as a clamp for a washer or annular plate 52 that supports one end of an expansible bellows 54.

The lower end of bellows 54 is closed by closure member 56 that has an upstanding cylindrical part 58 that loosely receives the upper end part of stem 34. The upper end of cylindrical part 58 is closed and terminates in an extension projecting through closure cap 50 to be connected with a manually operable cam lever 60, the purpose of which will be described hereinafter. The upper end of bellows 54 is open, and closure member 50 has a vent port 62 therein, so that the inside of bellows 54 is always at atmospheric pressure.

Depending on the lower end of bellows 54 is an arm 64 which pivotally receives the end of a yoke 66. Yoke 66 is also pivoted as by pin 68, to a pair of upstanding lugs 71 formed on the upper surface of partition 44 of auxiliary body 42 adjacent the bore 46 therein. Yoke 66 is secured thereto by rivet 68 and a latch member 70, which also receives pivot pin 68 so as to move as a unit with yoke 66. Latch member 70, as seen in Figure 2, is adapted for engaging undercut 72 in stem 34, so as to latch the valve members in their Figure 2 position. It will be apparent that counter-clockwise movement of yoke 66 and latch member 70, as viewed in Figures 1 and 2, will withdraw the said latch member from undercut 72. At this time, the valve members will close, due to spring 74 bearing between the underside of partition 44 and an upwardly facing shoulder on stem 34.

With reference to the opening of the valve members, it will be noted that stem part 32 is shouldered at the lower end of its fluted part as at 76, so that when it is lifted, it will abut the lower end of sleeve part 28 of the lower valve member and lift it from its seat.

The fluted part of valve stem 32 has a cross-drill 78 therein, which communicates with the passage 80 extending upwardly completely through stem part 34 and opening into the interior of cylindrical part 58. It will be apparent that cross-drill 78 is thus communicated with the interior of auxiliary body part 42 on the outside of bellows 54.

For moving the valve members to their open position, there is pivoted to body part 10, a lever 82 which is adapted for abutting the end of extension 84 of stem part 32. Extension 84 passes through suitable packing, as at 86, so that no leakage from the valve body occurs.

In operation, end 16 of valve body 10, is connected with the fill pipe of a tank to be filled. Thereafter, lever 82 is actuated, and this moves the valve members to their Figure 2 position, at which time latch member 70 falls into engagement with undercut 72 on stem part 34, thus retaining the valve members in their opened position and permitting fluid flow through flow passage 12 and into the tank being filled. Normally, the space between bellows 54 and auxiliary body part 42 is under little or no pressure due to this fluid flow, but as the tank begins to fill up, a back pressure is developed which is conveyed through cross-drill 78 and passage 80 into the aforementioned space, and acts to compress bellows 54 thereby to actuate yoke 66 and latch member 70 toward position to release valve stem 34. When the latch reaches its releasing position, as indicated in Figure 3, spring 74 becomes effective for quickly closing the valve members and interrupting fluid flow through passage 12.

It is preferable to provide the lower end of the aforementioned fill pipe with some type of float valve which will close when the fluid level in the tank reaches a predetermined level, thereby causing a rather rapid increase in the pressure of the fluid within the flow passage, and bringing about tripping of the valve into its closed position before the fill pipe leading to the tank is completely full. In this manner, the valve can be disconnected from the fill pipe with substantially no spillage of fluid.

It will be evident that as soon as the valve members close and the valve 10 is disconnected from the fill pipe, the pressure acting on bellows 54 will rapidly bleed off and return latch member 70 to its effective position. It will also be evident that the operating characteristics of the valve can be controlled to a certain degree by adjusting the amount which valve stem 34 extends into cylindrical part 58, because this determines the amount of fluid which will normally be retained within auxiliary body part 42 and thereby determines the size of the air space above the fluid, and the speed of reaction of bellows 54.

If for any reason, the valve should fail to operate automatically, the cam lever 60 can readily be snapped over to one side or the other from its center position, and automatically withdraw latch 70 from engagement with the valve stem.

Should it be desired to operate the valve as the usual type of manual valve, such as is used in filling stations on gasoline dispensing pumps, the manually actuated cam lever 60 can be thrown over to one side or the other 90° from the position which it occupies in Figures 2 and 3, and this will operate to hold the latching mechanism in ineffective positions at all times, thereby leaving the valve members completely under the control of spring 74 and lever 82. It will be apparent from the foregoing, that the valve mechanism, according to this invention, is relatively simple to manufacture and assemble, would have long service life, and would be easy to repair at any time.

This application is related in subject matter to the co-pending United States application in the name of Richard C. Reasoner, filed December 9, 1949, and bearing Serial Number 132,120.

It will be understood that this invention is susceptible to modification in order to adapt it to different usages and conditions, and, accordingly, it is desired to comprehend such modifications within this invention as may fall within the scope of the appended claims.

I claim:

1. In a valve having a valve body and a flow passage therethrough: a valve seat in said passage, a valve member movable against said seat from the inlet side thereof to interrupt said passage, a stem projecting from said valve member, an outwardly open compartment on said valve body into which said stem sealingly extends, a latch pivoted in said compartment and engageable with said stem when said valve member is moved into its open position, a bellows mounted in said compartment so as to close the open side thereof, a force multiplying linkage connecting said bellows with said latch, and a channel connecting the compartment with said flow passage above said valve member whereby a predetermined pressure in said flow passage will actuate said bellows and disengage said latch from said valve stem.

2. In a valve having a valve body with a flow passage extending therethrough; a valve seat in said passage, a valve member in said body resiliently urged toward engagement with said seat on the inlet side thereof for interrupting said passage, said valve having a stem, an auxiliary body part mounted on said valve body and into which said stem extends, sealing means around said stem where it enters said auxiliary body part, a latch in said auxiliary body part adapted for engaging said stem when the valve member is moved into its open position for retaining the said valve member in that position, a bellows in said auxiliary body part having one end anchored thereto and its other end connected with said latch, said bellows and auxiliary body part forming a closed compartment, and channel means extending through said valve stem for conveying pressure from said passage means above said valve member to said compartment whereby said bellows will be collapsed when a predetermined pressure is built up in said flow passage and release said valve member for movement to its passage interrupting position.

3. In a valve having a valve body with a flow passage therethrough; a valve member in said body movable for controlling said passage and having a stem, a compartment on said valve body into which said stem sealingly extends, an annular undercut on said stem, a latch member pivoted in said compartment for engagement with said undercut, a bellows in said compartment having one end anchored thereto and its other end connected with said latch member, a channel extending through said valve stem for conveying pressure from said passage on the upstream side of said valve member to said compartment for effecting disengagement of said latch member and collapse of said bellows when said pressure reaches a predetermined value, and a spring acting on said valve member and urging it toward its passage interrupting position.

4. In a valve having a body with a flow passage and a seat in the body; a valve member resiliently urged toward the upstream side of said seat and having a stem extending therefrom in both directions, an outwardly opening recess in one side of the body sealingly receiving one end of the stem, a shoulder on the stem in the recess, a latch in the recess to engage said shoulder when the valve member is moved away from the seat, a bellows having its outer end secured to the wall of the recess in sealing relationship, a plate closing the other end of the bellows and connected with the latch so collapsing of the bellows will disengage the latch from the stem, and a channel extending through the stem for communicating said flow passage above the valve member with said recess, said valve member comprising two parts having lost motion connection, one part to engage said seat and having a port therethrough, and the other part fastened to said stem and seating on said port.

5. In a valve having a body with a flow passage and a seat in the passage; a valve member resiliently urged toward engagement with said seat and having a stem extending therefrom in both directions, an outwardly opening recess in one side of the body sealingly receiving one end of the stem, a shoulder on the said one end of the stem, a latch pivotally mounted in said recess for engaging said shoulder when the valve member is moved away from the seat, a bellows having its outer end secured to the wall of the recess in sealing relationship and surrounding the stem, a plate closing the other end of the bellows and connected with the latch so the bellows normally urges the latch into effective position but will make the latch ineffective when the bellows is collapsed, said plate including a hollow cylindrical projection loosely surrounding said one end of the stem, and a channel extending through said stem and opening out the said one end thereof and communicating said flow passage with said recess, said valve member comprising two parts having a lost motion connection with one part being adapted to engage said seat and having a port therethrough and the other part being fastened to said stem and being adapted for seating on said port, and the other end of the stem extending out the valve body opposite said recess for manual actuation of the valve member.

6. In a valve having a body with a flow passage and a seat in the body; a valve member resiliently urged toward the upstream side of said seat and having a stem extending therefrom in both directions, an outwardly opening recess in one side of the body sealingly receiving one end of the stem, a shoulder on the stem in the recess, a latch in the recess to engage said shoulder when the valve member is moved away from the seat, a bellows having its outer end secured to the wall of the recess in sealing relationship, a plate closing the other end of the bellows and connected with the latch so collapsing of the bellows will disengage the latch from the stem, a channel extending through the stem for communicating said flow passage above the valve member with said recess, said valve member comprising two parts having lost motion connection, one part to engage said seat and having a port therethrough, and the other part fastened to said stem and seating on said port, a cover member mounted on the open side of said recess, and a rod secured to said plate and extending through said cover member for manual actuation of said latch.

7. In a valve having a body with a flow passage and a seat in the passage; a valve member resiliently urged toward engagement with said seat and having a stem extending therefrom in both directions, an outwardly opening recess in one side of the body sealingly receiving one end of the stem, a shoulder on the said one end of the stem, a latch pivotally mounted in said recess for engaging said shoulder when the valve member is moved away from the seat, a bellows having its outer end secured to the wall of the recess in sealing relationship and surrounding the stem, a plate closing the other end of the bellows and connected with the latch so the bellows normally urges the latch into effective position but will make the latch ineffective when the bellows is collapsed, said plate including a hollow cylindrical projection loosely surrounding said one end of the stem, a channel extending through said stem and opening out the said one end thereof and communicating said flow passage with said recess, said valve member comprising two parts having a lost motion connection with one part being adapted to engage said seat and having a port therethrough and the other part being fastened to said stem and being adapted for seating on said port, and the other end of the stem extending out the valve body opposite said recess for manual actuation of the valve member, a cover member mounted on the open side of the recess, said projection on said plate including a rod portion extending through said cover member, and a cam element pivoted to the outer end of said rod portion engageable with said cover member upon rotation of the cam element for manually moving said latch into ineffective position.

OTHELLO M. HILLMAN.

REFERENCES CITED

The following references are of record in the file of this patent:

UNITED STATES PATENTS

| Number | Name | Date |
|---|---|---|
| 1,287,457 | Schneider et al. | Dec. 10, 1918 |
| 1,725,826 | Payne | Aug. 27, 1929 |
| 1,890,847 | Flory | Dec. 13, 1932 |
| 2,330,616 | Parker | Sept. 28, 1943 |
| 2,357,657 | Jensen | Sept. 5, 1944 |
| 2,363,123 | Franck | Nov. 21, 1944 |
| 2,380,608 | Palm | July 31, 1945 |